United States Patent [19]

Kempf

[11] 4,165,084
[45] Aug. 21, 1979

[54] RECIPROCATING PUMP PACKING

[75] Inventor: Dennis D. Kempf, San Jose, Calif.

[73] Assignee: FMC Corporation, San Jose, Calif.

[21] Appl. No.: 892,069

[22] Filed: Mar. 31, 1978

[51] Int. Cl.² ............................ F16J 1/06; F16J 15/16
[52] U.S. Cl. ................................ 277/212 C; 277/149;
277/164; 277/165; 92/241
[58] Field of Search ................. 92/194, 196, 250, 254,
92/241; 277/47–50, 103, 112, 149, 152, 164,
165, 212 R, 212 C

[56] References Cited

U.S. PATENT DOCUMENTS

| 2,036,038 | 3/1936 | Gottlieb | 277/212 C X |
|---|---|---|---|
| 2,549,706 | 4/1951 | Page | 277/212 R X |
| 3,092,427 | 6/1963 | Sadler et al. | 92/240 X |
| 3,094,904 | 6/1963 | Healy | 92/241 |
| 3,103,787 | 9/1963 | Reynolds | 92/240 X |
| 3,450,412 | 6/1969 | Collett | 92/241 X |

FOREIGN PATENT DOCUMENTS

| 456050 | 4/1949 | Canada | 92/241 |
|---|---|---|---|
| 2146717 | 4/1973 | Fed. Rep. of Germany | 277/212 C |
| 1005224 | 12/1951 | France | 92/240 |
| 398998 | 9/1933 | United Kingdom | 92/240 |
| 427988 | 5/1935 | United Kingdom | 92/241 |
| 545556 | 6/1942 | United Kingdom | 277/212 C |

*Primary Examiner*—Robert S. Ward, Jr.
*Attorney, Agent, or Firm*—R. S. Kelly; H. M. Stanley; J. F. Verhoeven

[57] ABSTRACT

A packing for a reciprocating pump comprises a resilient body of elastomeric material with a cup-like shape and includes a plurality of flat cantilevered spring members embedded within the annular wall of the body. The spring members provide support for the flexible wall and are essentially fixed in position at their ends disposed at the base of the cup-shaped body while being free to flex at their opposite ends adjacent the open end of the resilient body. A peripheral annular lip defines the open end of the cup-shaped body and has a profile in the axial direction which imposes a predetermined deflection curve on the spring members when the packing is surrounded and compressed by the cylindrical wall of a pump cylinder. A predetermined pressure profile results between the peripheral lip and the cylinder wall as the cantilevered spring members urge the peripheral lip to resume its uncompressed shape.

6 Claims, 7 Drawing Figures

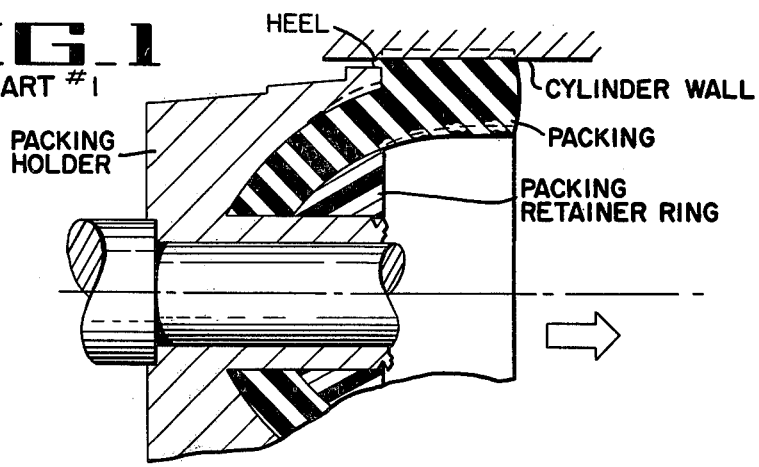
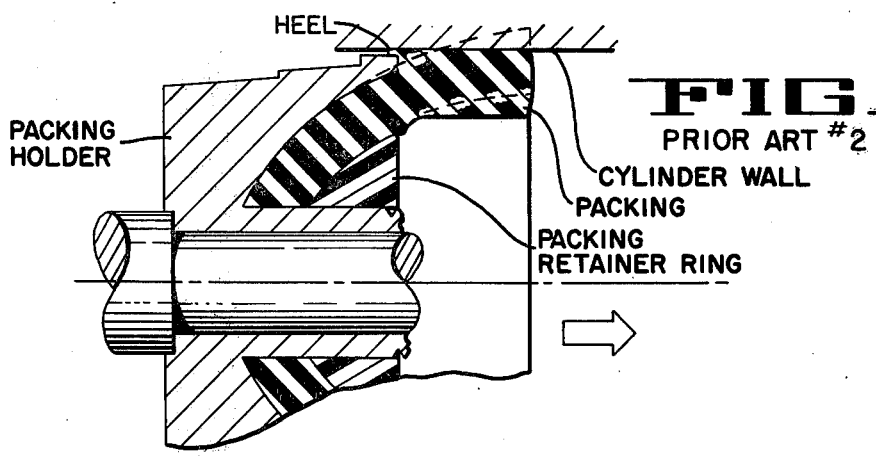
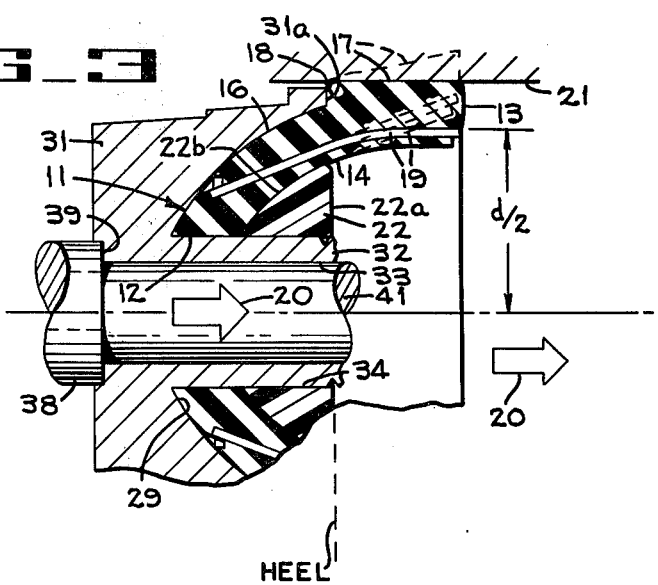

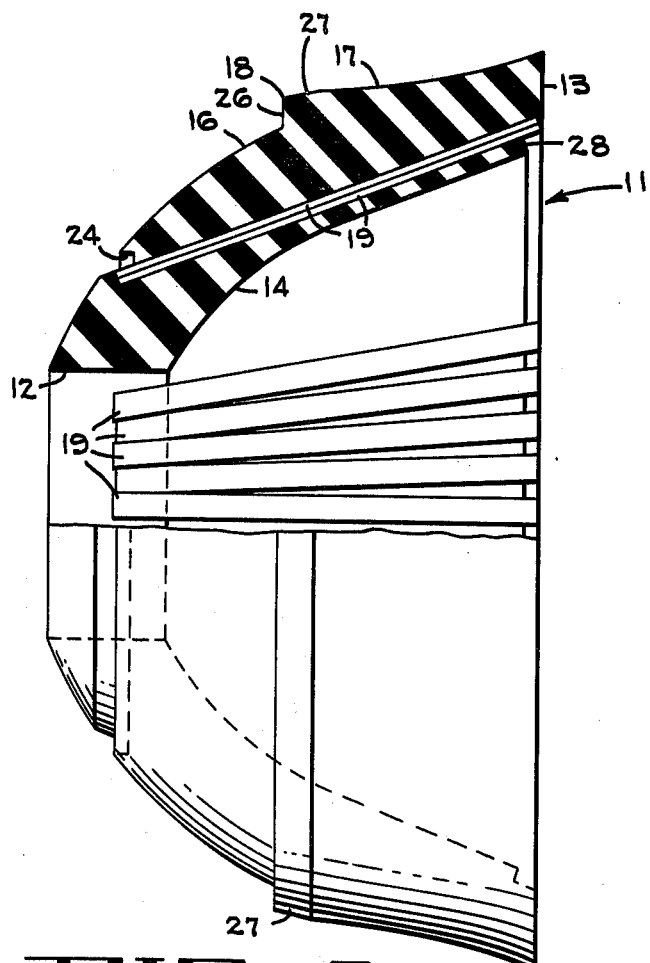
FIG_4
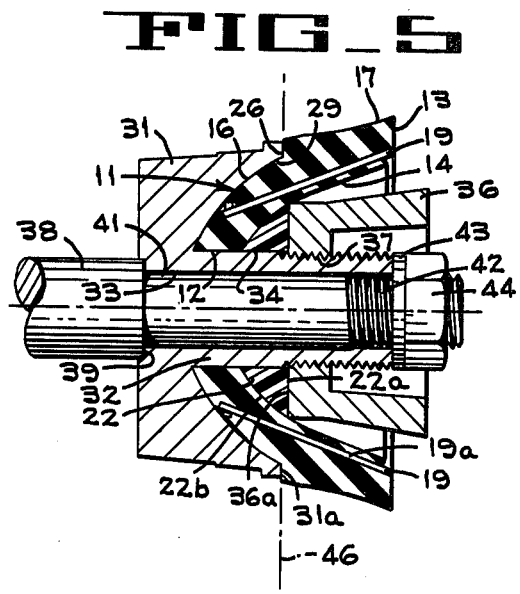
FIG_5
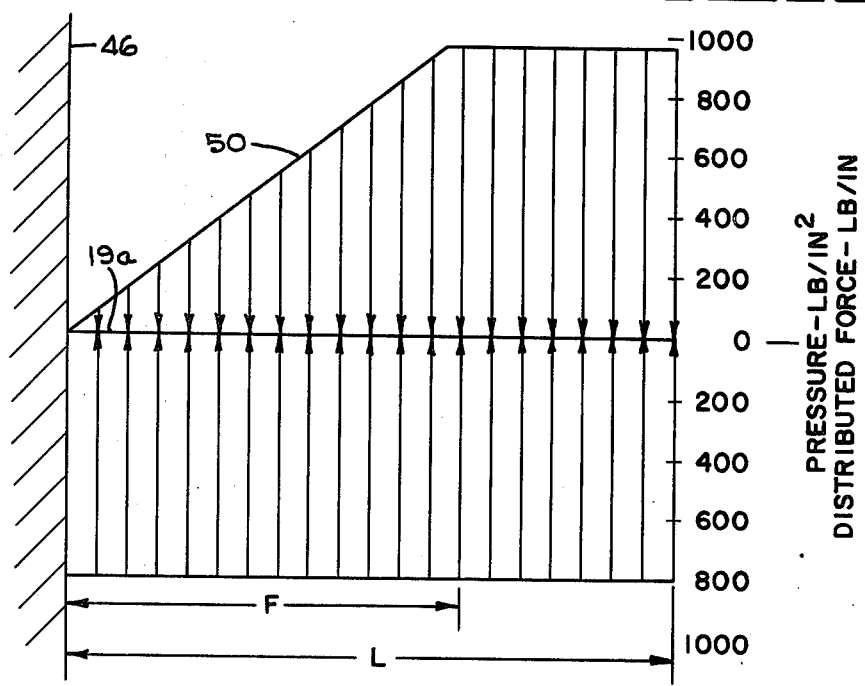
FIG_6

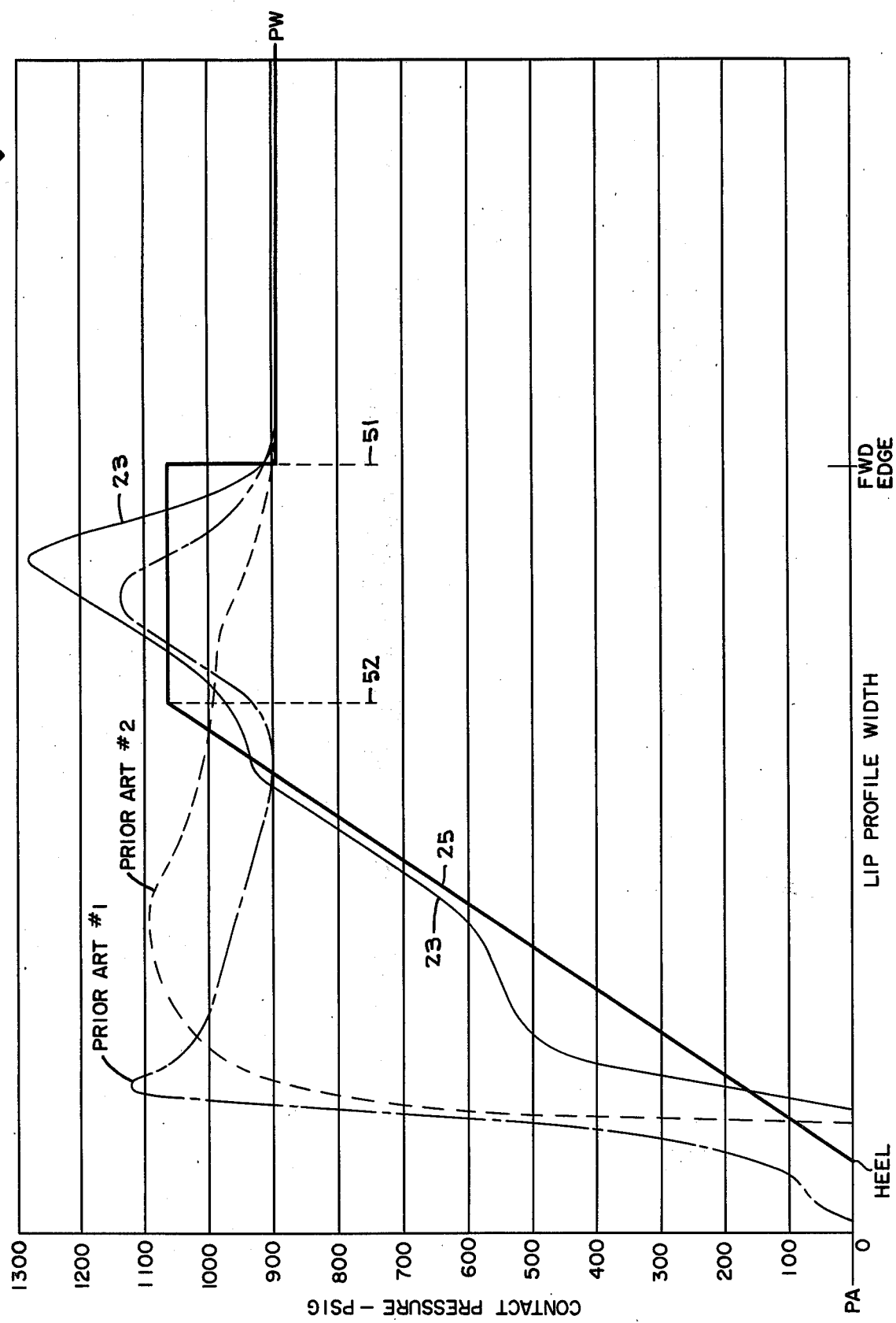

RECIPROCATING PUMP PACKING

BACKGROUND OF THE INVENTION

1. Field of the Invention

This invention relates to a resilient pump packing for reciprocating pumps, and more particularly it relates to a generally cup-shaped pump packing which provides resistance to deterioration and wear and consequent long useful life.

2. Description of the Prior Art

It has long been desirable to have packings for piston type pumps which provide constant sealing, reduced friction between the packing and the cylinder wall around the packing, and long packing life. A slush pump which purports to provide these characteristics is disclosed in U.S. Pat. No. 2,677,581, issued to Taylor. The pump piston disclosed in Taylor includes a longitudinally extending circular lip which is formed by a tapered flange of resilient material which provides a tight fit when compressed within the pump cylinder. The packing in Taylor is backed up by a solid flange member and is therefore not called upon to support pumping pressure solely with resilient packing material.

Several U.S. patents disclose packings for obtaining fluid-tight seals which include embedded metallic spring members. Such a disclosure is seen in U.S. Pat. No. 2,723,721 issued to Corsette which describes a packing to obtain a fluid-tight seal between a pipe and the wall of an uncased well hole or between a pipe and the casing in a well hole. Two rows of flat springs are concentrically arranged, so that they are fixed at one end and staggered in position around the circumference of the packing. The flat springs are embedded in the packing so that no packing is extruded due to high pressures on the inside surface of the packing. The Corsette disclosure does not discuss a predetermined pressure profile between the packing and the surrounding cylinder. Corsette refers to a tapered surface at the packing lip together with a rounded end, which preclude concentration of pressure at the packing lip.

U.S. Pat. Nos. 3,172,799 to Waldrop and 3,346,267 to Farley, disclose swabs or packing cups containing embedded metal reinforcing members. The swab cups are useful in withdrawing fluids from oil well casings and are specifically constructed to have beveled or tapered leading edges so that they may be drawn through a series of joined casings or pipes without becoming jammed within the casings or pipes due to variations in pipe diameter occurring at the joints.

U.S. Pat. No. 3,819,192 issued to Berry et al discloses a reinforcing structure for use in a well pressure sealing cup. The reinforcing structure includes a body with a plurality of upstanding tines which is made from a polyfurcated plate which is rolled into a cylindrical shape and wherein the free ends of the tines are bent inwardly to guide the pressure sealing cup past joints and other irregularities within the pipe being sealed.

FIG. 1 of the drawing shows a typical prior art packing cup having a nitrile impregnated cotton duck body with a cylindrical external surface disposed adjacent to the open end of the cup adapted to engage a surrounding cylinder wall. The packing cup of FIG. 1 has been manufactured by the Hercules Products Division of the Richardson Company, Albany, New York, and others and is provided with a shape which fits in a typical packing holder to be retained therein by a packing retainer ring. The packing holder is attached to the pump piston rod so that the packing will be reciprocated within the cylinder wall. The arrow in FIG. 1 indicates the direction of movement of the packing during the fluid pressure half of its pumping cycle. Referring to the graph of FIG. 7 a line marked "prior art 1" is shown which depicts the pressure profile between the heel and the forward edge of the external cylindrical surface of the packing of FIG. 1. With a working pressure, PW, against the inner cupped surface of the packing and atmospheric pressure, PA, against the opposite side of the packing cup of FIG. 1, it is observed that contact pressure across the cylindrical wall-engaging surface includes one pressure spike behind the forward edge of the cup and a second pressure spike near the heel of the cylindrical surface. Such a contact pressure profile provides for undue wear near the heel of the cylindrical surface where it is in contact with the cylinder wall and also indicates "ballooning" of the body member in the region near the heel of the cylindrical surface, as is shown, due to the differential between PW and PA. More precisely the high pressure graident at the heel region for the packing of FIG. 1 does not allow a fluid film to be retained between the packing and the cylinder wall. The film is quickly squeezed out toward the low pressure side and the essential cooling and lubricating film is lost. "Ballooning" at the heel allows elastomer material to extrude into the clearance between the packing holder and cylinder wall, further raising contact pressure and causing rapid wear. Ballooning also is an indication of flexure which fatigues the elastomer and results in bursting failure of the packing. The packing of FIG. 1 is shown in the relaxed condition by dashed lines and in the installed condition by solid lines.

FIG. 2 of the drawings shows another well-known reciprocating pump packing which has been in use for many years in Bean piston pumps manufactured by FMC Agricultural Machinery Division, Jonesboro, Arkansas. The pump packing of FIG. 2 is a generally spherical cup which is formed to fit within a well-known packing holder. The packing is held within the holder by a packing retainer ring as shown. The packing of FIG. 2 is shown in its relaxed shape by dashed lines. The lip of the packing of FIG. 2 is substantially compressed to take the form shown by solid lines when fitted within the wall of a pump cylinder. Typically a 0.125 inch radial interference fit is provided between the packing radius and the cylinder radius. The packing of FIG. 2 is shown to produce a ballooned portion near the forward edge of the rigid packing holder in much the same manner as described in conjunction with the prior art packing of FIG. 1. A corresponding pressure profile indicated as "prior art 2" in FIG. 7 shows a high pressure zone appearing at that point in the contact region between the cylinder wall and the packing. In the pressure profile of FIG. 7 substantially no contact pressure is seen between the forward lip of the packing and the cylinder wall. This situation creates a severe wear problem in the heel portion of the contact region due to the localized high pressure on the packing material there and the possibility of migration of foreign matter behind the packing cup lip and into the region between the packing cup and the cylinder wall. The wear problem is intensified by the flexing of the packing material due to the aforementioned "ballooning" of the packing cup, as shown, which occurs in the unsupported packing wall just forward of the packing holder. The flexing and "ballooning" results from the pressure differential between PW and PA and from the alternating axial friction forces applied to the packing by the cylinder wall during alternate half cycles of the pumping stroke.

It may readily be seen that a packing cup with support within the cup wall to reduce flexing therein and with a predetermined pressure profile between the cylinder wall and the wall-engaging surface of the packing cup would be desirable from the standpoint of decreasing wear and internal packing material deterioration and thereby increasing packing cup life.

SUMMARY OF THE INVENTION

In general, the packing disclosed herein is for use within a cylinder in a reciprocating pump and is alternately driven through a pressure stroke and a return stroke. The packing includes a generally cup-shaped resilient body member of elastomeric material with a pressure side exposed to the fluid being pumped under pressure and a return side exposed to atmospheric pressure. An annular lip is constructed on the resilient body member, with the lip having a heel adjacent the return side and a forward edge adjacent the pressure side. A predetermined lip profile in the axial direction provides for an increase in lip diameter between the heel and the forward edge. A plurality of angularly spaced cantilever spring members are embedded in the resilient body member. The spring members extend from a position adjacent the return side of the body member to a position underlying or within the annular lip. The annular lip is disposed for engagement with the wall of the cylinder and the lip is compressed by the cylinder wall so that a predetermined pressure profile is produced therebetween with a relatively high pressure adjacent the forward edge. The pressure diminishes to a substantially zero level at the heel of the annular lip. The plurality of spring members urge the forward edge of the annular lip outwardly when compressed to enhance the high pressure adjacent the forward edge. Thus, the pressure between the annular lip and the cylinder wall is sufficiently high at the forward edge to preclude entry of foreign matter between the packing and the cylinder wall and to provide a seal but falls off at a sufficiently low rate progressing toward the heel to preclude squeezing of the lubricant film from between the annular lip and the cylinder wall. Moreover, the spring members reinforce the packing wall and resist any "ballooning" effect which is inherent in such packings without spring members due to the differential pressure between the pressure and return sides of the packing. Packing wear life, particularly during use in high pressure, high temperature applications, is therefore enhanced.

BRIEF DESCRIPTION OF THE DRAWINGS

FIG. 1 is a fragmentary section of a prior art packing enclosed within the wall of a pump cylinder.

FIG. 2 is a fragmentary section, similar to FIG. 1, of another prior art packing enclosed within the wall of a pump cylinder.

FIG. 3 is a fragmentary section, similar to FIGS. 1 and 2, of the packing of the present invention enclosed within the wall of a pump cylinder.

FIG. 4 is an enlarged side elevation of the pump packing of the present invention with a portion thereof being broken away and shown in section and with such packing being shown in its uncompressed state.

FIG. 5 is a reduced central section of the pump packing of the present invention installed in a packing holder but shown in its uncompressed state.

FIG. 6 is an assumed loading diagram for the cantilevered spring members embedded in the packing of the present invention.

FIG. 7 is a graph showing one desirable pressure profile and actual pressure profiles across the contact areas between the packing and the cylinder wall for the packings of FIGS. 1, 2 and 3.

DESCRIPTION OF THE PREFERRED EMBODIMENT

In FIG. 3 a novel packing for a reciprocating pump is shown having an elastomeric cup-shaped body member 11 with an aperture 12 through the base end of the cup. Resilient body member 11 has a forward annular edge 13, an inner, concave pressure side 14 and an outer, convex return side 16. An annular lip 17 provides a peripheral surface on the resilient body member 11 which extends from a heel 18 adjacent the return side 16 to the forward edge 13. A flat elongate spring member 19 is shown in FIG. 3, embedded in the resilient body member 11 extending from a position adjacent the return side 16 to a position underlying the annular lip 17 and adjacent to the forward edge 13. Resilient body member 11 is shown in FIG. 3 in solid lines in a compressed condition within a cylinder wall 21. A centrally disposed packing retainer ring 22 is shown in position bearing against the pressure side 14 of the cup-shaped body member 11. The dotted lines in FIG. 3 show the free shape of the resilient cup-shaped body member 11 and spring member 19 prior to compression within the cylinder wall 21.

The free shape of the annular lip 17 (shown in dashed lines in FIG. 3) is compressed when fitted within the cylinder wall 21, the material underlying the annular lip 17 being forced inwardly and that portion of spring member 19 underlying the annular lip 17 being also forced inwardly. A slight bulge may form at the forward edge 13 as the material of the annular lip 17 and the material beneath it are compressed against the spring member 19 and some of the material moves laterally slightly as seen in FIG. 3. When in use, the resilient cup-shaped body member 11 is held in place on the pressure side 14 by the packing retainer ring 22 and on the return side by a packing holder 31 having a concave recess to receive the body member 11 which recess is defined by an annular planar face 31a which is generally aligned with the front annular planar face 22a of the retainer ring. The retainer ring and packing holder thereby secure the inner end of spring member 19 therebetween and provide for a cantilevered section of the spring member extending from the forward face 22a of the packing retainer ring 22 to the forward edge 13 of body member 11. The free shape of the annular lip 17 (as best shown in FIG. 4) and the cantilevered section of spring member 19 provide a pressure pattern between the cylinder wall 21 and the axially extending face of the annular lip 17 when the packing is fitted within the cylinder wall 21. One desirable pressure profile is shown at 25 in FIG. 7 for comparison purposes having a constant pressure region immediately behind the forward edge 13 and a subsequent gradually decreasing pressure gradient proceeding toward the heel 18. A curve 23 in FIG. 7 describes one pressure profile observed across the annular lip 17 of the present invention when resilient body member 11 is installed within the cylinder 21. It may be seen in FIG. 7 that the pressure between the annular lip 17 and the cylinder wall 21 in the example curve 23 of FIG. 3 reaches a maximum value immediately behind the forward edge 13. As soon as the annular lip 17 is "worn in" the peak behind the forward edge will diminish and an approximately constant value will be maintained along a length of about 25% of the annular lip profile width as indicated by the spacing between the lines 52 and 51 in FIG. 7. Behind this region of relatively constant pressure proceeding toward the heel 18 of annular lip 17 is a region of substantially constant and gradual decrease in pressure between the annular lip 17 and the cylinder wall 21, as shown, with the pressure ultimately dropping somewhat more sharply to atmospheric pressure PA near the heel.

When installed in a pump cylinder the body member 11 is moved within the cylinder in the direction of arrow 20 during a pressure stroke and in the opposite direction during a return stroke. The pressure side 14 of body member 11 is subjected to the working pressure PW, during the pressure stroke. The return side 16 is generally exposed to atmospheric pressure, PA. Therefore, the annular lip 17 is urged against the cylinder wall 21 by the working pressure PW during the pressure stroke as well as by the pressure arising from the compression of the material in the annular lip 17 and the deflection of spring 19. In summary, the pressure between cylinder wall 21 and annular lip 17 is described by a profile thereacross, as seen at 23 in FIG. 7, which profile includes a maximum pressure immediately behind the forward edge 13 together with a constantly decreasing pressure proceeding toward the heel 18 where substantially zero pressure exists. Care is taken in providing spring members 19 with physical characteristics such that when the cantilevered portions thereof are displaced, no bending stresses are present therein which exceed the elastic limit of the spring material. As a consequence, the pressure profile 23 is obtained which is substantially free from distortion over a span of time due to "cold flow" of materials as occurs with unreinforced elastomer cups.

The spring member 19 further provides support for the packing which prevents "ballooning" of the resilient body member 11 in the area of the heel 18 due to the differential pressure between PW and PA. The spring members 19 also resist packing material axial flexure due to reversing friction forces applied by the cylinder wall during stroke direction reversal. The pressure upon the annular lip 17 adjacent the forward edge 13 is enhanced by the working pressure PW applied along the cantilevered portions of the spring members 19. Part of the inner pressure force PW acting at the heel which in the absence of the springs would cause ballooning is reacted as a shear load at the base of the cantilever springs 19. The remainder of this force is reacted in the forward portion of the lip through a lever effect. The packing spring member 19 may be modified in physical dimensions and material to provide a wide variety of desired pressure profiles between the annular lip 17 and the confining cylinder wall 21.

Further details of construction of the preferred embodiment of the resilient cup-shaped body member 11 are shown in detail in FIG. 4. An elastomeric material of approximately 90 durometer on the Shore A scale has been found to be particularly useful in the formation of the cup-shaped body member 11. Return side 16 generally has the shape of a portion of a sphere, having a rear circular access slot 24 therein. A rear circular planar face 26 defines the heel 18 on the annular lip 17. A slight chamfer 27 is imposed on the heel 18 in the preferred embodiment, the purpose of which is hereinafter described in conjunction with the description of FIG. 6. Annular lip 17 in the free, or uncompressed, state is seen to have an external profile which describes an increasing diameter for the body member 11 proceeding from the heel 18 toward the forward edge 13. A forward circular access slot 28 is shown in the packing body beneath the forward edge 13. Concave pressure side 14 extends between the forward circular access slot 28 and the central aperture 12 in the base of the resilient body member 11 providing a surface which is substantially concentric with the convex surface of return side 16.

A plurality of the spring members 19 are embedded in the cup-shaped body member 11 extending between the rear circular access slot 24 and the forward circular access slot 28. The rear and forward circular access slots 24 and 28 are provided so that the ends of the spring members 19 may be engaged and held by a mold structure (not shown) utilized for forming the body member 11 with the spring members 19 embedded therein. Spring members 19 each comprise flat elongate leaf spring members which, in combination, are disposed in a frusto-conical array wherein the frustum has a minor base disposed toward the base of the cup-shaped body member 11 and a major base disposed toward the forward edge 13 or open end of the body member 11. The spring members 19 which terminate at the minor base of the frustum toward the base of the cup-shaped body member 11 are shown to overlap the ends of immediately adjacent spring members 19. The purpose of the overlapping in this embodiment is to provide for a sufficient number of spring members 19 so that the packing is appropriately stiffened and flexure due to the aforementioned "ballooning" of the resilient body member 11 is minimized by the support provided by such spring members. It is envisioned that the array of spring members 19 could consist of a single layer of non-overlapping discrete flat spring bars, or that it could consist of such an array joined by a rigid ring member at the minor base of the frustum.

In FIG. 5 a sectional view of an assembly including the packing of FIG. 4 is shown with the annular lip 17 and the spring members 19 being shown in a relaxed, or free, condition, i.e., with the pump rod assembly not being mounted within a pumping cylinder. As explained in connection with FIG. 3, the assembly of FIG. 5 moves with the base end of the cup-shaped body member 11 leading during a return stroke and moves with the forward edge 13 leading during a pressure stroke. The resilient cup-shaped body member 11 is disposed with return side 16 seated against the substantially matching surface 29 formed on packing holder 31. A boss 32 having an upper threaded end and a bore 33 extending therethrough is provided on the packing holder 31. Aperture 12 in the base of body member 11 is formed to fit around the boss 32, so that the resilient body member 11 is captured within the packing holder 31 between the boss and the inner concave surface 29. Packing retainer ring 22 also has a bore 34 therethrough formed to surround the boss 32. An annular curved surface 22b is formed on the rear side of packing retainer ring 22 and substantially matches the concave surface on the pressure side 14 of the cup-shaped body member 11. A packing nut 36 has a threaded bore 37 therethrough for engaging the threaded end of boss 32.

When installed, packing nut 36 has a surface 36a thereon which abuts against the front planar face 22a of retainer ring 22 to thereby retain the resilient body member 11 firmly in position relative to the packing holder 31. The rear circular planar face 26 on body member 11 abuts the front circular planar face 31a on the packing holder 31 to further secure the resilient body member 11 in place upon the holder 31. The piston rod 38 has a shoulder 39 thereon abutting the base of the packing holder 31 and further has a cylindrical extension 41 having a diameter formed to fit through the central bore 33 in packing holder 31. The cylindrical extension 41 has a threaded end 42 which extends beyond the threaded end formed on the boss 32. A sealing washer 43 is passed over the threaded end 42, and a nut 44 is threaded thereon to secure the packing holder 31 to the piston rod 38 and provide a tight seal at the center of the assembly between the pressure side 14 and the return side 16 of the resilient body member 11.

As was described earlier herein it has been found advantageous to provide a predetermined pressure pattern across annular lip 17 when the packing is compressed within the cylinder wall 21 which pattern has a relatively high pressure at that portion of annular lip 17 adjacent to the forward edge 13 of body member 11. It has further been found that it is advantageous to maintain the relatively high pressure level at a relatively constant value over a distance behind the forward edge 13 which may be typically 25% of the lip width. From that point on it is desirable to impose a decrease in the pressure profile so that it falls gradually and evenly to substantially a zero pressure level prior to reaching the heel 18 on annular lip 17.

When the assembly of FIG. 5 is installed within a cylinder wall 21, the pressure between the cylinder wall 21 and the annular lip 17 during a pressure stroke will at least be equivalent to that pressure PW exerted against the pressure side 14 of body member 11. Clearly, there must be a mechanical preload between the annular lip 17 and the cylinder wall 21 in addition to the force imposed by the pressure PW, because the pressure PW is not applied during the return stroke. Thus, suction would be lost on the return stroke, and the fluid to be pumped would not be drawn into the pump cylinder.

The base of the cup-shaped body member 11 is seen in FIG. 5 to be firmly held within the packing holder 31 by the packing retainer ring 22, with the annular surface 22b engaging the pressure side 14 of the resilient body member 11. Therefore, the packing retainer ring 22 substantially fixes the ends of the array of spring members 19 from the minor base of the frustum to a point along each spring member where it intersects a plane which includes the annular surface 26 of the body member which is engaged by the front face 31a of the packing holder 31. Such a plane is seen in FIG. 5 as plane 46. Therefore, that cantilevered portion of the spring members 19 which extends toward the front edge 13 from the plane 46, and which is indicated at 19a in FIG. 5, will be analyzed for the purpose of demonstrating how a predetermined pressure profile is imposed at the interface between the annular lip 17 and the cylinder wall 21. Reference is made to the text "Formulas for Stress and Strain," 3rd Edition, 1954, R. J. Roark, pages 100 and 101, cases 3, 4 and 8. Case 3 pertains to a cantilever beam with a uniform load applied thereto. Case 4 pertains to a cantilever beam with a partial uniform load applied thereto. Case 8 pertains to a cantilever beam with a partial triangular load applied thereto, with the highest loading level being toward the free end of the beam. These formulas are intended by Roark for straight as opposed to curved beams. A small error due to the substantial elastic deformation of these spring elements (beams) is recognized but considered relatively unimportant as compared to larger unknowns arising from the unknown degree of cold flow within the elastomer and wear of the elastomer lip. At any given time in the life of the packing, forces due to deflection of the elastomer are small as compared to forces due to deflection of the spring elements and diminish due to cold flow of the elastomer during the installed life of the packing. Such forces are consequently ignored as being of short duration and secondary importance.

While the main interest is to establish a predetermined pressure profile across the annular lip 17 at the cylinder wall 21, initially, the relationships discussed in cases 3, 4 and 8 mentioned hereinbefore are applied to the cantilever spring portion 19a of each spring 19 in the present invention and a description of the resulting spring curvature is obtained. FIG. 6 is a simplified diagram depicting the loading of a *straight* beam in which the small effect of substantial beam curvature due to beam elastic deflection is ignored. A uniform load for the length L of the cantilever spring portion 19a, such as that discussed in case 3 of the Roark text, is shown exerted upwardly in FIG. 6, such loading representing the pumping pressure, or working pressure, PW against the pressure side 14 of the resilient cup-shaped body member 11 during the pressure stroke. A triangular-shaped, downwardly directed load, such as that discussed in case 8 in the Roark text, is presumed to be applied to the cantilever spring portion 19a adjacent to the plane 46, the length of the cantilever spring portion 19a which is subjected to the triangular loading being designated by the letter F (FIG. 6). The remainder of the length of the cantilever spring portion 19a is presumed to be loaded with a uniformly applied, downwardly directed maximum load, such as that discussed in case 4 of the Roark text, for a length equivalent to L minus F (to seal the leading edge of the packing). The entire force loading as shown in FIG. 6 will impose a predetermined curvature on the cantilever spring portions 19a which can be readily determined in accordance with the formulas set forth in the Roark text for the various loading conditions. The upwardly directed distributed force corresponds to the working pressure PW, and the combination of the triangular distributed load and the uniform distributed load is seen as the pressure loading curve 50 over the length L of spring portions 19a (FIG. 6). The distributed force loading represented by curve 50 therefore represents a pressure profile along the length L of the spring portions 19a which is imposed by the annular lip 17 of the packing. To a rough approximation, if the calculated predetermined curvature of the cantilever spring portions 19a can be duplicated in the installation, the pressure profile 50 will also be duplicated.

Having selected the predetermined pressure profile 50 (FIG. 6) to be imposed upon annular lip 17, the next task is to obtain the predetermined curvature of the cantilever spring portions 19a which will provide the pressure profile. The predetermined curvature is now calculated using a loading typified by FIG. 6. The number of cantilever spring portions 19a is known as well as the mechanical characteristics of each spring member. For example, in one embodiment of the invention 60 separate spring members were used each having a width of 0.08 inches and a thickness of 0.02 inches. The spring members were made from beryllium copper sheet stock and the cantilevered length L of spring portion 19a was set at 0.625 inches. The "effective diameter" of the array of spring members was 1.75 inches. One half of the "effective diameter" is shown in FIG. 3 as d/2. The length of the triangular distributed load, F, was selected as 0.41 inches. In this particular example, the pumping pressure was selected at 800 psi, the uniformly applied load was selected as 960 psi, and the triangular shaped load over the length F was selected to range from 960 psi to zero as shown. Utilizing packing material of 90 durometer on the Shore A scale, calculations in accordance with cases 3, 4 and 8 of Roark provide the curvature and stress information seen in Table I for each cantilever spring portion 19a with the distance X representing the measured distance along the spring from the free end thereof and the distance Y representing the deflection distance at such measured spring distance.

TABLE I

| X-inches | Y-inches | STRESS-psi |
|---|---|---|
| 0 (FREE END) | 0.149 | 70,828 |
| 0.05 | 0.130 | 35,952 |
| 0.10 | 0.113 | 25,075 |
| 0.15 | 0.095 | 33,123 |
| 0.20 | 0.078 | 55,022 |
| 0.25 | 0.062 | 85,696 |
| 0.30 | 0.046 | 120,070 |
| 0.35 | 0.033 | 153,070 |
| 0.40 | 0.021 | 179,621 |
| 0.45 | 0.012 | 194,647 |
| 0.50 | 0.006 | 193,075 |
| 0.55 | 0.002 | 169,828 |
| 0.60 | $1.62 \times 10^{-4}$ | 119,832 |
| 0.65 | $1.16 \times 10^{-4}$ | 38,013 |

Note from Table I that the free end of the cantilevered spring portion 19a is at the position X=0 which corresponds to the end of the spring member within the forward circular access slot 28 at the forward edge 13 of body member 11. The free shape of annular lip 17 (as shown in FIG. 4) is then computed so that when the annular lip is confined within the cylinder wall 21 the deflection distances of Table I are obtained for the cantilever spring portions 19a of spring members 19 at the appropriate points corresponding to points along the lip 17 engaged by the cylinder wall. This is done by adding elastomer radially at each incremental distance along the annular lip 17 so that the unstressed lip will exceed the radius of the cylinder wall 21 by the desired spring deflection at that increment. By way of example, at that position on annular lip 17 overlying the free ends of cantilever spring portions 19a, 0.149 inches of deflection is desired. Therefore, knowing the radius of the cylinder wall 21, enough elastomer is added on the annular lip 17 to produce a radius on the resilient cup-shaped body member 11 at the front edge 13 which is 0.149 inches greater than the radius of the cylinder wall 21. Referring again to Table I and proceeding 0.05 inches along the springs from the free ends thereof, the radius of the resilient cup-shaped body member 11 is fabricated so that it is 0.130 inches greater than the radius of the cylinder 21. In like manner, at each 0.05 inch increment along the springs proceeding toward the base of body member 11, the radius of the annular lip 17 is fabricated to be equivalent to the radius of the cylinder 21 plus an amount equivalent to the desired deflection of the cantilever spring portion 19a. It should be noted here that the chamfer 27 on the heel of the annular lip 17 as seen in FIG. 4 is present to guarantee a zero gage, or atmospheric pressure at the plane 46 as seen in the loading profile 50 of FIG. 6. It is desirable to reduce the contact pressure to zero at a position forward of the heel to insure that no elastomeric material is extruded into the clearance space between the packing holder 31 and the cylinder wall 21. Such extrusion causes a wedging action in the clearance space and consequent severe packing wear. Since the material from which the body member 11 is made is elastomeric, it must be taken into account, as discussed hereinbefore, that some of the body member material will move axially when compressed as shown by the slight bulge at the forward edge 13 in FIG. 3. An additional amount of elastomer may be added to the free surface of annular lip 17 to compensate for this axial migration under compression. If the variation is not critical, it may be discounted as an acceptable error in the actual curvature obtained in the cantilevered spring portions 19a.

In making a judgment as to the acceptability of a group of computation results exemplified by those in Table I, it is apparent that none of the stress levels calculated along the length of the cantilever spring portions 19a may exceed the elastic limit for the spring member material being used. As hereinbefore stated beryllium copper material is satisfactory for use in the spring members of this invention, since it has an elastic limit of approximately 200,000 psi in readily available stock. The tip deflection of the cantilevered spring portions 19a is selected so that there will be sufficient elastomeric material so that some packing material may be removed through wear while still accomplishing the packing function. It is recognized that as the elastomer wears from annular lip 17, the pressure pattern will tend to decrease and slightly change shape. However, with the imposition of the original pressure profile, foreign matter will be excluded from migration into the region between the wall of cylinder 21 and annular lip 17 by the high pressure adjacent the forward edge 13 of body member 11. Moreover, the original pressure profile will be selected to be sufficiently low so that lubrication and cooling films will not be squeezed out of the region between the annular lip 17 and the wall of cylinder 21.

The array of spring members 19 provides a relatively constant preload force distribution or pressure profile seating the packing against the walls of cylinder 21, which force distribution, notwithstanding wear at the annular lip 17, is substantially free from reduction due to material "cold flow" for a considerable length of time. The array of spring members 19 further provides support for the packing to resist forces due to pressure exerted against the pressure side 14 of body member 11, thereby preventing structural deterioration of the body member resulting from repeated flexure due to "ballooning" and reversing friction forces. The array of spring members 19 further operates to effectively enhance the pressure toward the free end of the cantilevered spring portions 19a during a pressure stroke. Thus, flexure within the resilient body member 11 is reduced, lubricant film is maintained between the packing and the cylinder walls, and foreign matter is excluded from the region between the packing and the cylinder walls, all of which add to the long life characteristics of the disclosed packing for applications ranging from low pressure-low temperature to high pressure-high temperature pumping.

Although the best mode contemplated for carrying out the present invention has been herein shown and described, it will be apparent that modification and variation may be made without departing from what is regarded to be the subject matter of the invention.

What is claimed is:

1. In a reciprocating pump, an improved piston assembly including a single packing adapted to be coupled to the pump rod for reciprocal motion within the cylinder of the reciprocating pump, said packing including a resilient, generally cup-shaped body member of an elastomeric material adapted to be coupled to said pump rod, said body member including an inner annular portion and an outer annular lip, said annular lip of said resilient body member having a forward edge defining the radially outer annular edge of said body member and a heel spaced rearwardly therefrom with a predetermined relaxed profile therebetween providing a maximum diameter at said forward edge, said forward edge being the leading edge when said pump rod is moved against the pressure of fluid in said pump, and means for coupling the inner annular portion of said body member to said pump rod, wherein the improvement comprises:

a plurality of circumferentially spaced cantilever spring members embedded in said resilient body member and extending therein from a fixed position within the inner annular portion of the cup-shaped body member through substantially the entire length of the lip to a position radially underlying said forward edge of said annular lip, said annular lip being disposed for engagement within the bore of the cylinder and said unstressed maximum diameter of said forward edge thereof being substantially greater than the diameter of said bore so that said annular lip is compressed thereby so that the portions of said spring members within said lip are deflected and a predetermined pressure profile is induced by said spring members between said annular lip and the bore of the cylinder having a high pressure contact region extending from adjacent said forward edge a predetermined distance toward said heel and thereafter diminishing to substantially zero pressure at said heel, whereby a fluid-tight seal is formed at said high pressure contact region during the suction stroke of said piston assembly and foreign matter is precluded from entry between said forward edge on said annular lip and the cylinder wall during the pressure stroke of said piston assembly to thereby enhance the wear life of the packing.

2. In a reciprocating pump as set forth in claim 1 wherein said relaxed annular lip profile continuously increases in diameter from said heel to said forward edge and said predetermined pressure profile includes a substantially constant high pressure across said high pressure contact region and a substantially constant rate of pressure decrease thereafter toward said heel.

3. A packing as in claim 1 wherein said heel has a chamfer thereon, whereby substantially zero pressure is exerted between the cylinder wall and said annular lip at said heel.

4. A packing for reciprocal motion within a cylinder in a reciprocating pump comprising a resilient cup-shaped body member of an elastomeric material having a base and a forward annular lip, said base having a central passage extending therethrough for reception of the piston rod of the pump, a frusto-conical array of spring members embedded in the annular wall of said cup-shaped body member with the minor base of the frustum disposed within said body member base and the major base of the frustum underlying said forward annular lip, said spring members extending throughout substantially the entire axial length of the annular lip to the forward edge thereof, said annular lip having a circumferential profile extending from the outer annular edge of the body member and providing a continuously decreasing diameter of the body member progressing to said base whereby the annular lip will have a compression fit within the cylinder along said external profile, so that the ends of said array of spring members underlying said forward lip are deflected inwardly and a predetermined pressure profile is obtained between the cylinder and said lip, said pressure profile providing pressure between said lip and said cylinder which is in appropriate zones sufficiently high to prevent admission of wear particles between the forward edge of said lip and the cylinder and which is sufficiently low to prevent liquid film between said lip and the cylinder from being reduced to a point wherein the film thickness precludes adequate lubrication therebetween.

5. A packing as in claim 4 wherein said frusto-conical array of spring members comprises a plurality of flat cantilever beams substantially fixed and in overlapping relationship within said resilient body member base at the minor base of the frustum and substantially unrestrained and movable beneath said lip at the major base of the frustum, said beams being straight when the packing is in a relaxed condition.

6. A packing as in claim 4 wherein said external profile extending axially along the cylinder engaging surface of said lip comprises a concave line.

* * * * *